Dec. 15, 1959 G. W. FREDERICKS 2,917,730

ALARM APPARATUS FOR ANNOUNCEMENT SYSTEMS

Filed Aug. 29, 1957

2 Sheets-Sheet 1

INVENTOR
G. W. FREDERICKS
BY A. M. Hassell
ATTORNEY

Dec. 15, 1959 G. W. FREDERICKS 2,917,730

ALARM APPARATUS FOR ANNOUNCEMENT SYSTEMS

Filed Aug. 29, 1957

2 Sheets-Sheet 2

INVENTOR
G. W. FREDERICKS
BY A. M. Hassell
ATTORNEY 2,917,730

ALARM APPARATUS FOR ANNOUNCEMENT SYSTEMS

George W. Fredericks, Woodhaven, N.Y., assignor to Bell Telephone Laboratories, Incorporated, New York, N.Y., a corporation of New York Application August 29, 1957, Serial No. 680,997

11 Claims. (Cl. 340—213)

Figure 1:
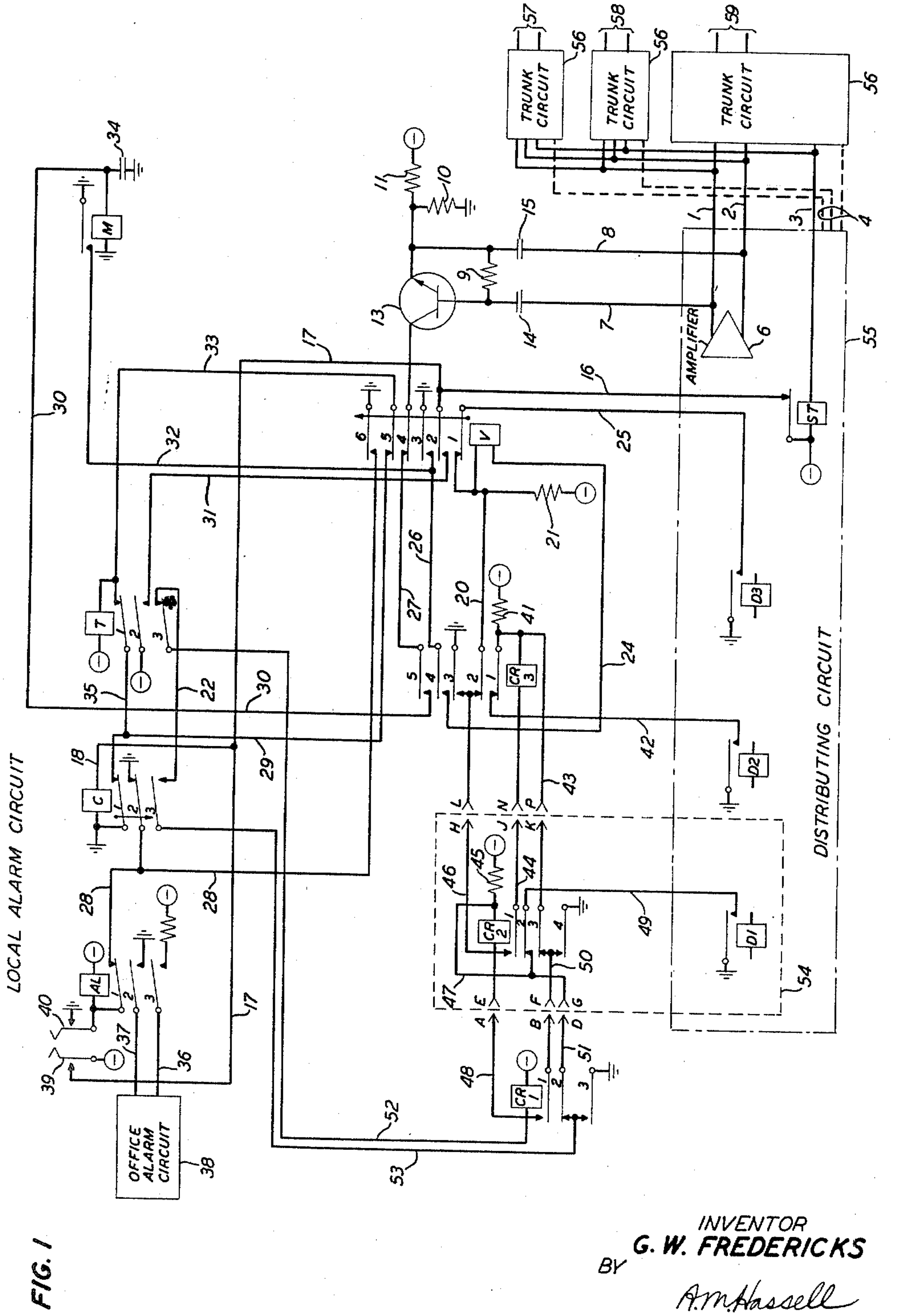

This invention relates to alarm apparatus and more particularly to alarm apparatus which is associated with recorded announcement telephone systems.

Announcement systems usually employ automatic switching equipment for establishing and maintaining large numbers of concurrent connections between subscribers' lines and a bus carrying amplified announcements. An example of such a system is disclosed in Patent No. 2,213,511, granted September 3, 1940 to W. Bennett.

It is desirable that equipment be available to monitor such announcement systems and to signal the central office staff in the event of either insufficient amplitude on the announcement bus or malfunction in the associated switching equipment. In certain embodiments, such switching equipment manifests correct operation by the appearance therein of an electrical condition on selected conductors in a characteristic and repetitive sequence, every other possible sequence representing some form of malfunction.

It is therefore an object of this invention to provide a monitoring system which will check for the correct sequence of electrical conditions on a given group of conductors and which will not check any particular conductor until said condition has been applied to and removed from the preceding conductor in the sequence.

Another object is to provide a simple device which will test an announcement bus for the presence of a predetermined minimum voltage amplitude.

A further object of this invention is to provide a local alarm device which will be actuated by incorrect-sequence operation, low announcement bus voltage amplitude, failure of power supply, or any failure within the local alarm system itself.

Thus, in accordance with one feature of this invention, a plurality of relays or similar switching means are ganged in tandem in a checking relay chain unique to alarm systems, whereby the locking and operating circuits of each such relay are prepared by the preceding relay, and the operating winding of each relay is effectively shunted during the period that ground, for example, is applied to the operating conductor of the preceding relay.

Another feature of this invention is a transistor device having its input connected to the announcement bus and its output connected to a marginal relay. The marginal relay fails to operate when the output of the transistor falls below a predetermined value corresponding to a predetermined minimum voltage amplitude on the announcement bus, thereby resulting in the actuation of the central office alarm.

Briefly, in one of the preferred embodiments the invention comprises an alarm relay, a control relay, a marginal relay, a transistor device, and a checking relay chain. The alarm relay is normally operated and held in an operated position by a principal locking circuit. Accordingly, failure of the battery supply results in the release of the relay and the actuation of the central office alarm.

A normal test cycle is initiated by the interruption of the operating winding circuit of the control relay. This relay has both fast and slow-releasing contacts. The principal locking circuit of the alarm relay includes a pair of the slow-releasing contacts. The fast-releasing contacts initiate the action of the checking chain, which must complete its check successfully and establish an auxiliary locking circuit for the alarm relay before the slow-releasing contacts of the control relay release and interrupt the principal locking circuit.

The checking chain is a group of relays ganged in tandem. Each of these relays is connectable to a different one of a number of selected conductors, called control conductors, of the announcement system which is being monitored, and each is operated in response to the activation of (i.e., the application of ground to) its control conductor. The locking and operating circuits of each relay are enabled by the operation of the next preceding relay, and the operating winding of each relay is shunted by a conductor connected to the control conductor of the next preceding relay. Consequently, each relay in succession must operate and lock before the next can operate. In addition, ground must be removed from each control conductor before the next relay can respond to ground on its own control conductor. This results from the fact that when ground is concurrently connected to two successive control conductors, apparatus connected to the first will effectively isolate from battery the relay connected to the second, thereby rendering the second ineffective until ground is disconnected from the first.

The transistor device is connected across the announcement bus and operates into the winding of a marginal relay. This relay is operated only when the voltage amplitude on the announcement bus is sufficiently high, and the operation of the last relay of the checking chain is made contingent upon the operation of this announcement bus-voltage relay. When the correct sequence of ground pulses has been applied to the control conductors and the voltage amplitude is adequate, the last relay in the chain operates, closing an auxiliary locking circuit for the alarm relay (thereby preventing it from releasing and sounding the alarm) and initiating means for resetting all the relays in the local alarm circuit.

Figure 2:
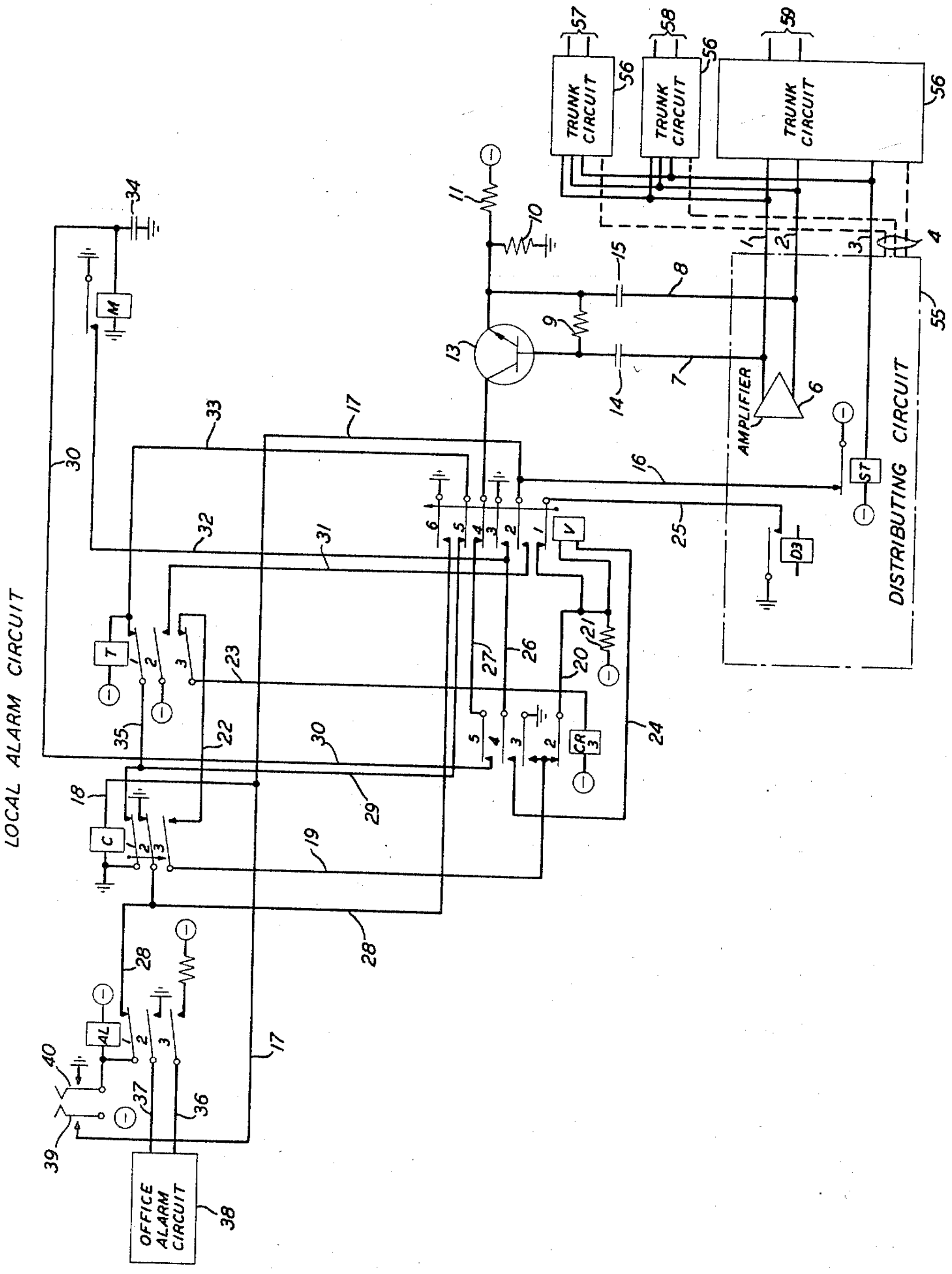

The operation of one preferred embodiment of the invention together with other objects and features of the invention will be more clearly apparent from the appended claims and the drawings in which:

Fig. 1 is a schematic diagram disclosing an embodiment of the invention arranged to monitor three control conductors; and Fig. 2 is a schematic diagram disclosing a variation of the invention in which one control conductor is monitored.

Referring now to both Figs. 1 and 2, there are depicted therein an office alarm circuit 38, trunk circuits 56, a distributing circuit 55, and a local alarm circuit comprising all the apparatus not included in any of the other three enumerated circuits. These four circuits should be distinguished in Fig. 1 from the apparatus contained in the dotted rectangle 54 which includes elements of both the local alarm and the distributing circuits. For present purposes the dotted line bounding rectangle 54 may be disregarded and the respective elements of the apparatus contained therein may be considered as integral parts of the circuits with which they are associated. Thus conductor 48, for example, should be considered to be continuous at terminals A—E and a similar consideration applies to the other conductors at terminals B—F, D—G, H—L, J—N, and K—P.

Referring more specifically to Fig. 1, the announcement system which is to be monitored comprises the distributing circuit 55 and the trunk circuits 56. Only those distributing circuit elements which operate in cooperative association with the local alarm circuit have been shown in the figure, the remainder having been eliminated in the interest of clarity. Amplifier 6 in the distributing circuit is supplied with a recorded announcement signal from a source not shown. This signal could be a weather report, the time of day, a notice that certain lines are out of service or any other class of desired information. When a subscriber dials a number assigned to the announcement service, such as WEather 6–1212, his line is extended to one of the trunk circuit equipments 56 in some one of any number of well-known ways as determined by the type of central office equipment in use in the particular area. The trunk circuits 56 serve to connect lines 57—59 respectively to the announcement bus 1—2 which carries the output of amplifier 6. As soon as any incoming line is connected to one of lines 57—59 by the central office switching equipment the associated trunk circuit indicates this condition to the distributing circuit by applying ground to conductor 3 thereby initiating the operation of the recorded announcement apparatus. This indication will be maintained as long as any incoming line is connected to any one of lines 57—59.

The appearance of ground on conductor 3 causes start relay ST to operate. The operation of relay ST initiates a number of functions within the distributing circuit which occur once each announcement cycle and which may be represented by the action of distributing relays D–1, D–2, and D–3. It may be supposed, for example, that relay D–2 operates at the beginning of an announcement, signaling trunk circuits 56 to connect lines 57—59 to announcement bus 1—2; that relay D–3 operates shortly thereafter, signaling the local offices to begin the charge period; and that relay D–1 operates at the completion of an announcement, signaling the trunk circuits that the announcement is completed. After receiving a predetermined number of such completion signals a trunk circuit disconnects its associated line such as line 59. These signals are passed from equipment (not shown) in the distributing circuit over cable 4 to equipment (not shown) in the trunk circuits. These functions will only be accomplished correctly by one successive operation and release during an announcement cycle of relays D–1, D–2, and D–3 in that order.

Since the apparatus recycles with each completed announcement the operation of relay D–1 at the end of one cycle and the operation of relays D–2 and D–3 at the beginning of the next cycle form a sequence of rapidly occurring events which readily form the basis of a check for the proper operation of the distributing circuit. The local alarm system is required to recognize any deviation from this sequence. Further, the local alarm system is required to coincidentally test the amplitude of the signal on announcement bus 1—2 to determine whether it is of sufficient magnitude.

In both figures relays AL, C, and T are shown standing in the operated position. Alarm relay AL is operated and locked over a path extending from ground at the No. 2 front contacts of operated control relay C, over conductor 28, the No. 1 front contacts of relay AL, to the operating winding thereof and battery. Control relay C is operated over a first path extending from ground through the operating winding of relay C, conductors 18, 17, and 16, to the contacts of relay ST and battery. Relay T is operated over a first path extending from ground through the No. 1 front contacts of operated relay C, conductor 35, and the No. 1 front contacts of relay T, to the operating winding thereof and battery. Conductor 35 is also shunted by a second and alternate path over conductor 29, the No. 5 back contacts of relay V, and conductor 33. Relays AL, C, and T stand in the positions shown during periods between tests, i.e. during periods when no lines such as lines 57—59 are connected to the trunk circuit and start relay ST is unoperated. When manually operated, key 39—40 establishes operating paths (hereinafter described) for relays AL, C and T.

Testing is initiated by the appearance of a call at a trunk circuit 56 and the consequent operation of start relay ST. Relay ST operates and interrupts the hereinbefore described first operating circuit of relay C causing the relay to release. The Nos. 1 and 2 front contact of control relay C are slow in releasing, and may be adjusted to hold for long periods, i.e. periods of as long as five minutes or more. The No. 3 back contacts of relay C release substantially instantaneously while the Nos. 1 and 2 front contacts are still holding, and this release enables an operating path for checking relay CR–1.

If the distributing circuit is operating correctly distributing relay D–1 will subsequently operate at the end of the first and each succeeding announcement cycle in response to means not shown, thereby signaling the trunk circuits 56 that an announcement has been completed and extending a path from ground over its own front contacts, control conductor 49, the No. 2 back contacts of checking relay CR–2, conductor 51, the No. 2 back contacts of relay CR–1, conductor 53, the No. 3 back contacts of relay C conductor 22, the No. 3 front contacts of relay T and conductor 52 to the operating winding of relay CR–1 and battery. Relay CR–1 operates and locks itself through operated relays C and T by applying ground to conductor 53 over its own No. 3 front contacts.

With relay CR–1 operated, the No. 1 contacts thereof are closed and operating and locking circuits are enabled thereby for relay CR–2. Before relay CR–2 will operate, however, relay D–1 must be released and ground must be removed from control conductor 49. This release is necessary in order to interrupt a shunting circuit around the operating winding of relay CR–2. Relay D–1, when operated, extends ground through control conductor 49, the No. 2 back contacts of relay CR–2 and conductor 47 to the junction of current-limiting resistor 45 and the operating winding of relay CR–2. Should ground appear on conductor 48, the opposite terminal of the operating winding of relay CR–2, due to the operation of distributing relay D–2 in a manner to be hereinafter more fully explained, relay CR–2 would remain inoperative, there being no difference of potential across its operating winding.

But, as mentioned above, when the distributing circuit is operating properly relay D–1 is released after a short interval and at this time relay D–2 is operated by means not shown thereby signaling the trunk circuits 56 to connect lines 57—59 to announcement bus 1—2 and extending a path from ground through the contacts of relay D–2, control conductor 42, the No. 1 back contacts of checking relay CR–3, conductor 43, the No. 3 back contacts of relay CR–2, conductor 50, the No. 1 front contacts of relay CR–1, conductor 48, the operating winding of relay CR–2 to the resistor 45 and battery. Relay CR–2, if not shunted by the operation of relay D–1, operates and locks itself through operated checking relay CR–1 by applying ground to conductor 50 over its own No. 4 front contacts. With its No. 1 front contacts closed, relay CR–2 enables operating and locking circuits for checking relay CR–3. Control conductor 49 is disconnected from the local alarm circuit by the opening of the No. 2 back contacts of relay CR–2. The disconnection of control conductor 49 serves to isolate the checking chain from the effects of later operations of relay D–1. Relay D–1 operates whenever a complete announcement cycle ends. Since the actual duration of the announcement may be appreciably less than the time required for the release of control relay C it is possible that another announcement cycle may end and relay D–1 may be reoperated before relay C has been fully released. As will be hereinafter more fully explained, such a subsequent operation of relay D–1 would appear as a malfunction in the distributing circuit and would actuate the alarm. To prevent such an occurrence control conductor 49 is therefore temporarily disconnected from the local alarm circuit.

Relay D–2 must next be released before relay CR–3 can operate. This requirement arises from considerations similar to those heretofore discussed concerning the release of relay D–1 and the operation of relay CR–2. The operating winding of relay CR–3 is shunted over a path extending from ground at relay D–2 and the contacts thereof over conductor 42, and the No. 1 back contacts of relay CR–3 to the junction of the operating winding thereof and current-limiting resistor 41. Should D–2 fail to be released, the operation of relay D–3 would not result in a potential difference across the operating winding of relay CR–3 because both terminals of the winding would be connected to ground; consequently, no current would flow therein, and the relay would not operate.

If, then, the distributing circuit operates in the normal manner, relay D–2 is released and shortly thereafter distributing relay D–3 is operated, signaling the respective central offices to begin the charge period and resulting in the extension of a path from ground at relay D–3 through the contacts thereof, control conductor 25, the No. 1 back contacts of slow-releasing relay V, conductor 20, the No. 2 back contacts of relay CR–3, conductor 46, the No. 1 front contacts of relay CR–2, conductor 44, the operating winding of relay CR–3, and resistor 41 to battery. Relay CR–3 operates and locks itself through operated checking relay CR–2 by applying ground to conductor 46 over its own No. 3 front contacts. In addition, it closes its No. 4 front contacts, thereby enabling an operating and locking circuit for relay V, and opens its No. 1 back contacts, thereby disconnecting control conductor 42 from the local alarm circuit. This disconnection is for the same purpose as the hereinbefore described disconnection of control conductor 49. Relay CR–3, when operated, also closes its No. 5 contacts thereby completing a hereinafter described operating circuit for marginal relay M.

The N–P–N type transistor 13 is connected to output conductors 1 and 2 of amplifier 6 by conductors 7 and 8 and blocking capacitors 14 and 15. The resistors 10 and 11 are chosen to properly bias the transistor emitter. The amplifier output, carrying the desired announcement, appears across resistor 9 in the emitter-base circuit. The transistor collector circuit extends from the collector of transistor 13 through the No. 4 back contacts of relay V, conductor 27, the No. 5 front contacts of relay CR–3 and conductor 30 to parallel branches going through the operating winding of marginal relay M and ground on the one hand and through capacitor 34 and ground on the other. Essentially the transistor acts to vary the current in the winding of relay M in direct proportion to the amplitude of the signal applied to conductors 7 and 8. Marginal relay M is adjusted to operate in response to a current value which corresponds to the minimum signal voltage amplitude which is to be permitted on announcement bus 1—2 without actuating the office alarm.

The capacitor 34 serves a dual function. It acts as a filter to smooth the output of the transistor and consequently also the current flowing through the winding of the marginal relay M, and it serves to protect the transistor from inductive transients produced in the winding of relay M upon the release of the relay. Should the voltage alarm feature not be desired, relay M, transistor 13, and the associated conductors may be omitted, and conductor 32 may be tied to ground.

If, at this point, the announcement signal voltage amplitude on announcement bus 1—2 equals or exceeds the predetermined minimum signal voltage amplitude, marginal relay M will operate, extending a path from ground at relay M over conductors 32 and 26, the front contacts 4 of relay CR–3, conductor 24, the operating winding of relay V and resistor 21 to battery. Relay M has thus completed an operating circuit for slow-releasing relay V; but before relay V can operate relay D–3 must be released. This requirement arises from considerations similar to those heretofore described concerning the release of relays D–1 and D–2 and the operation of relays CR–2 and CR–3, respectively. The operating winding of relay V is shunted over a path extending from ground at relay D–3 and the contacts thereof through control conductor 25 and the No. 1 back contacts of relay V to the junction of the operating winding thereof and current-limiting resistor 21. Should relay D–3 fail to be released, the operation of marginal relay M would not result in a potential difference across the operating winding of relay V, consequently no current would flow therein, and the relay would not operate.

If, then, the distributing circuit operates in the normal manner, relay D–3 will be released and relay V will operate and lock itself through operated checking relay CR–3 by applying ground to conductor 26 at its own No. 3 front contacts. In addition, relay V interrupts the second of the two operating circuits for relay T by opening its No. 5 back contacts, interrupts the operating circuit for marginal relay M by opening its No. 4 back contacts, and disconnects control conductor 25 from the local alarm circuit by opening its No. 1 back contacts. The reason for the disconnection of control conductor 25 and the earlier-described disconnections of control conductors 49 and 42 will now be explained.

It should be noted in this regard that relays CR–1, CR–2, CR–3 and V, ganged in tandem in that order, form a checking chain with the locking circuit of each relay passing through contacts of the next preceding relay, thus making the continued operation of any relay a necessary condition for the continued operation of the next succeeding relay. It may be seen that normally all checking relays preceding an arbitrarily selected checking relay must be operated for the selected relay to operate and lock because each succeeding relay depends on the operation of the one next before it for a complete operating path. Accordingly, should the first relay of the chain be somehow released, all succeeding relays in the chain would release in succession. Similarly, were any one of the relays to be released all succeeding relays would be released. Thus, if a control conductor, such as conductor 49 for example, were not disconnected from the local alarm circuit, any later operation of its associated distributing relay (D1 in this case) would result in the release of all succeeding relays in the checking chain.

As pointed out in the brief description the prevention of an alarm is made contingent upon the establishment of an operated condition in the last relay in the checking chain, i.e., relay V, before the release of the slow-releasing contacts of relay C, and this requires that nothing release the relays of the checking chain until relay V has operated. Thus, the subsequent operation of a relay such as relay D–1, although a normal condition as pointed out heretofore, would cause the chain to release and would result in the initiation of a false alarm indication were it not for the temporary disconnection of control conductors 49, 42, and 25.

The office alarm circuit 38 is actuated by Nos. 2 and 3 back contacts of relay AL which, when closed, extend ground and battery to conductors 37 and 36, respectively. An alarm will result whenever relay AL is deenergized, thereby providing a fail-safe feature in that a failure of the normal battery supply will cause relay AL to release and actuate the alarm over the paths hereinbefore described. Relay AL is normally locked in an operated position over a previously described principal circuit extending from battery through its operating winding and No. 1 contacts, conductor 28 and the slow-releasing No. 2 contacts of control relay C to ground.

It should be recalled that the testing hereinabove described is instituted by the interruption of the first operating winding circuit of relay C. Thus, if the auxiliary locking circuit for relay AL, extending from conductor 28 over the No. 6 front contacts of relay V to ground, is not established before the No. 2 contacts of relay C release, relay AL will be deenergized and will initiate the alarm. Thus the operation of relay V is necessary to the timely establishment of the auxiliary locking circuit for relay AL. The successive application and removal of ground on control conductors 49, 42, and 25, in that order, and the detection of a predetermined minimum voltage amplitude on announcement bus 1—2 must all occur during the interval of time intermediate to the deenergization of control relay C and the opening of the slow-release contacts thereof if the alarm is not to be actuated.

From an examination of the sequential dependencies within the checking chain, it will be apparent to those skilled in the art that should any contact or relay in the checking chain fail, the faulty relay or the relay operated by the circuit containing the faulty contact would release and all succeeding relays in the chain would revert to their unoperated conditions. On that or the next test cycle relay AL would release, thus providing a fail-safe operation.

After the expiration of a predetermined delay, the Nos. 1 and 2 slow-releasing front contacts of relay C release. The No. 1 contacts open and interrupt the first of the two locking circuits for relay T which extends from ground at relay C, through the No. 1 front contacts thereof, conductor 35, the No. 1 front contacts of relay T and the operating winding thereof to battery. The second operating circuit for relay T, which extends over the No. 1 front contacts of relay C, conductor 29, the No. 5 back contacts of relay V, and conductor 33 to the operating coil of relay T is opened as a result of the operation of relay V. Relay T therefore releases, thereby interrupting the first of the two above-described locking paths for relay T in still another place by opening the No. 1 front contacts thereof. In addition, relay T, in releasing, connects battery to conductor 16 over a path extending through the No. 2 back contacts of relay T, conductor 31 and the No. 2 front contacts of relay V to conductor 16; and it also interrupts the operating circuit of checking relay CR–1, which includes the No. 3 front contacts of relay T.

As heretofore described, relays CR–1, CR–2, CR–3 and V form a checking chain with each dependent upon the operation of the next preceding relay for the maintenance of its locking circuit. The release of relay CR–1 interrupts the operating winding circuit of relay CR–2 causing CR–2 to release. Relay CR–2, when released, interrupts the operating circuit of relay CR–3 and so on until the operating winding of slow-releasing relay V is deenergized. Since relay V is slow-releasing, front contacts 6 thereof hold momentarily, preventing the release of alarm relay AL until after sufficient time has alapsed for the reoperation of control relay C from battery over a second operating path which will now be described.

During intervals when no testing is being accomplished by the local alarm system, relay C is held operated by the application of battery over the contacts of relay ST in a hereinbefore described manner. The release of relay T results in the operation of relay C over a second operating path extending from ground at relay C through the operating winding thereof, conductors 18, 17, and 16, the No. 2 front contacts of relay V, conductor 31, the No. 2 back contacts of relay T and battery.

Control relay C, when operated, interrupts the operating circuit of relay CR–1 at still another point by opening its No. 3 back contacts, it partially enables the first and second previously-described operating circuits for relay T by closing its No. 1 front contacts, and it reestablishes the principal locking circuit for alarm relay AL by closing its No. 2 front contacts. In this connection it should be recalled that relay V is adjusted so that its contacts do not release until after sufficient time has elapsed for the re-establishment of the primary locking circuit by relay C. When relay V does release, the previously described second of two operating circuits for relay T is re-established over the No. 5 back contacts of relay V. Relay T operates, locking itself over the previously-described first of the two operating circuits by closing its own No. 1 front contacts, it interrupts the second operating path of control relay C by opening its No. 2 back contacts, and partially enables the operating circuit for relay CR–1 by closing its No. 3 front contacts.

In the event no lines such as line 57 are connected to the trunk circuit 56, relay ST will have released and control relay C will remain energized over the previously-described first path notwithstanding the opening of the No. 2 back contacts of relay T in the second operating path. In that event, all relays then stand in the position shown in Fig. 1 in which condition they are prepared to test the next sequence of operation.

Should lines such as line 57 be connected to the trunk circuit when relay T reoperates, the contacts of relay ST will be open in the first operating path for the winding of control relay C and the operation of relay T will interrupt the second and only remaining path thereby deenergizing the operating winding of control relay C. The No. 3 fast-releasing contacts thereof release, and the entire testing cycle will begin again.

It should be noted from the drawings that should alarm relay AL be released for any reason, no circuit has been provided for automatically reoperating it. Consequently, after an alarm, it is necessary to reset the local alarm circuit by manually operating key 39—40. Contacts 39, when operated, extend a path from battery on contacts 39 through conductors 17 and 18 and the operating winding of relay C to ground. Relay C, when operated, reoperates relay T over a previously-described path. Contacts 40, when operated, complete an obvious path through the winding of relay AL which results in the operation and locking of the relay and the removal of the alarm indication.

While the apparatus disclosed in Fig. 1 is designed to test the sequential operation of three control conductors 49, 42, and 25, it will be seen that the circuit shown in Fig. 1 can be easily modified to test the sequence of grounding of two, three, or more such conductors. Should a test of only two conductors be required, the apparatus contained in dotted rectangle 54 may be removed and checking relays CR–1 and CR–3 may be connected as follows: Terminal A is connected to terminal L, terminal B is connected to terminal N, and terminal D is connected to terminal P. This, in effect, removes one relay (CR–2) from the checking chain. Similarly, if it is desired to check more than three control conductors, additional units, each containing apparatus identical to the apparatus contained in dotted rectangle 54, may be inserted in the checking chain between terminals A—B—D and E—F—G to the left of unit 54 or between terminals H—J—K and L—N—P to the right of unit 54. One such unit must be added for each additional control conductor monitored. These units may be added by following the insertion procedure outlined above as often as may be required. Of course, the holding time of control relay C would have to be appropriately adjusted to compensate for the increased time required for the complete operation of the lengthened checking relay chain.

Turning now to Fig. 2, it should be observed that it differs from Fig. 1 only in that the components in Fig. 1 associated with distributing relays D–1 and D–2, i.e., checking relays CR–1 and CR–2, and their associated circuitry, have been omitted. Conductors 19 and 23 have been added to replace conductors 53 and 52, respectively. Accordingly, the apparatus disclosed in Fig. 1 has been modified in Fig. 2 to provide an alarm for a distributing system having but one control conductor.

In Fig. 2 the interruption of the operating winding circuit of control relay C by the appearance of ground on conductors 3 in a manner similar to that hereinbefore set forth for Fig. 1 enables operating and locking circuits for checking relay CR–3 over the No. 3 fast-releasing back contacts of relay C.

The operation of distributing relay D–3 extends a path from ground at relay D–3, through control conductor 25, the No. 1 back contacts of relay V, conductor 20, the No. 2 back contacts of relay CR–3, conductor 19, the No. 3 fast-releasing back contacts of relay C, conductor 22, the No. 3 front contacts of relay T, conductor 23 and the operating winding of checking relay CR–3 to battery. Relay CR–3 operates. The subsequent consequential operations which result from the operation of relay CR–3 in Fig. 2 are identical with the operations which follow that of relay CR–3 in Fig. 1 as hereinbefore set forth.

While I have illustrated my invention by particular embodiments thereof, my invention is not limited in its application to the specific apparatus and particular arrangements therein disclosed. Various applications, modifications, and arrangements of the invention will readily occur to those skilled in the art.

What is claimed is:

1. In a switching system having an alarm device and a plurality of control conductors which are activated by said system only in a particular preselected sequence upon the proper operation of said switching system, apparatus comprising a plurality of switching means arranged in tandem, means included in each of said switching means responsive to the operation of said each of said switching means for enabling the next of said switching means, each of said switching means being associated with certain of said control conductors and all of said switching means being operable in a predetermined combination when said control conductors are activated in said preselected sequence, said switching means being operated in other than said predetermined combination when said control conductors are activated in other than said preselected sequence, and means for actuating said alarm device responsive to the operation of said switching means in any other than said preselected combination.

2. Apparatus according to claim 1 wherein each of said switching means when enabled is operable in response to the activation of a different one of said control conductors, said apparatus further comprising a plurality of means, each associated with one of said switching means and effective upon the activation of the control conductor to which said one of said switching means is responsive to inhibit the operation of the next of said switching means.

3. In a switching system having an alarm device and a plurality of control conductors which are activated by said system only in a particular preselected sequence upon the proper operation of said switching system, a plurality of switching means comprising a first relay effective when released to activate said alarm device, a second relay, means effective when said first relay is released for connecting a first one of said control conductors to said second relay, a third relay, means effective when said second relay is actuated for connecting a second one of said control conductors to said third relay, a fourth relay, means effective when said third relay is actuated for connecting a third one of said control conductors to said fourth relay, a fifth relay operable in response to said fourth relay, circuit means interconnecting said first control conductor and said third relay for effectively preventing the operation of said third relay when said first control conductor is activated, circuit means interconnecting said second control conductor and said fourth relay for effectively preventing the operation of said fourth relay when said second control conductor is activated, circuit means interconnecting said third control conductor and said fifth relay for effectively preventing the operation of said fifth relay when said third control conductor is activated, and means responsive to the operation of said fifth relay for inhibiting the operation of said alarm device.

4. In a switching system having an alarm device and a plurality of control conductors which are activated by said system only in a particular preselected sequence upon the proper operation of said switching system, a plurality of switching means comprising a first relay effective when released to activate said alarm device, a second relay, means effective when said first relay is released for connecting a first one of said control conductors to said second relay, a third relay, means effective when said second relay is actuated for connecting a second one of said control conductors to said third relay, a fourth relay, means effective when said third relay is actuated for connecting a third one of said control conductors to said fourth relay, a fifth relay operable in response to said fourth relay, a first circuit means interconnecting said first control conductor and said third relay for effectively preventing the operation of said third relay when said first control conductor is activated, means effective when said third relay is actuated for interrupting said first circuit means, a second circuit means interconnecting said second control conductor and said fourth relay for effectively preventing the operation of said third relay when said second control conductor is activated, means effective when said fourth relay is operated for interrupting said second circuit means, a third circuit means interconnecting said third control conductor and said fifth relay for effectively preventing the operation of said fifth relay when said third control conductor is activated, means effective when said fifth relay is operated for interrupting said third circuit means, and means responsive to the operation of said fifth relay for inhibiting the operation of said alarm device.

5. In a signal monitoring and switching system having an alarm device, a source of output signals whose amplitude is maintainable within predetermined limits, and a plurality of control conductors which are activated by said switching system only in a particular preselected sequence upon the proper operation of said switching system, alarm apparatus comprising means responsive to excursions in the amplitude of said signals beyond said predetermined limits for actuating said alarm device, a plurality of switching means arranged in tandem, means included in each of said switching means responsive to the operation of said each of said switching means for enabling the next of said switching means, each of said switching means being associated with certain of said control conductors and all of said switching means being operable in a predetermined combination when said control conductors are activated in said preselected sequence, said switching means being operated in other than said predetermined combination when said control conductors are activated in other than said preselected sequence, and means for actuating said alarm device in response to the operation of said switching means in any other than said predetermined combination.

6. Apparatus according to claim 5 wherein each of said switching means when enabled is operable in response to the activation of a different one of said control conductors, said apparatus further comprising a plurality of means, each associated with one of said switching means and effective upon the activation of the control conductor to which said one of said switching means is responsive, to inhibit the operation of the next of said switching means.

7. Apparatus according to claim 6, wherein said means responsive to excursions in the amplitude of said signals comprises a transistor device, and said switching means comprise relays.

8. In a recorded announcement telephone system having an announcement bus and a plurality of control conductors selectively energizable to control operating functions, an alarm circuit comprising a threshold device responsive to the amplitude of an announcement signal on said bus, a plurality of relays arranged in tandem, a plurality of means each associated with one of said relays and responsive to the operation of said one of said relays for enabling the next of said relays, each of said relays being connected to one of said control conductors and all of said relays being operable in a predetermined combination when said control conductors are energized according to a predetermined sequence, said relays being operable in other predetermined combinations when said conductors are energized according to any other sequence, and an alarm device operated in response to the operation of said relays in any of said other predetermined combinations, said alarm device being further operated by said threshold device when the amplitude of said announcement signal is below a predetermined level.

9. In a switching system having an alarm device and a plurality of control conductors which are activated by said system only in a particular preselected sequence upon the proper operation of said switching system, a plurality of switching means arranged in tandem, each of said switching means being enabled in response to the operation of the next preceding of said switching means, each of said switching means being associated with a different one of said control conductors and, when enabled, being operable in response to the activation of its associated control conductor, means associated with each of said switching means for disabling its associated switching means upon the activation of the control conductor associated with the next preceding of said switching means, said switching means being operable in a predetermined combination when said control conductors are activated in said preselected sequence, said switching means being operated in other than said predetermined combination when said control conductors are activated in other than said preselected sequence, and means for actuating said alarm device responsive to the operation of said switching means in any other than said preselected combination.

10. In a switching system having an alarm device and a plurality of control conductors which are activated by said system only in a particular preselected sequence upon the proper operation of said switching system, a plurality of switching means comprising a first relay effective, when released, to activate said alarm device, a second relay, means effective when said first relay is released for connecting a first one of said control conductors to said second relay, a third relay, means effective when said second relay is operated for connecting a second one of said control conductors to said third relay, a fourth relay operable in response to said third relay, circuit means interconnecting said first control conductor and said third relay for effectively preventing the operation of said third relay when said first control conductor is activated, circuit means interconnecting said second control conductor and said fourth relay for effectively preventing the operation of said fourth relay when said second control conductor is activated, and means responsive to the operation of said fourth relay for inhibiting the operation of said alarm device.

11. In a signal monitoring and switching system having an alarm device, a source of output signals whose amplitude is maintainable within predetermined limits, and a control conductor which upon the proper operation of said system is activated by said system within a pre-established interval after the initiation of the operation of said system, alarm apparatus comprising a first relay releasable in response to said initiation of operation and effective when released to activate said alarm device, a second relay, means effective when said first relay is released for connecting said control conductor to said second relay, a third relay operable in response to said second relay, circuit means interconnecting said control conductor and said third relay for effectively preventing the operation of said third relay when said control conductor is activated, means responsive to the operation of said third relay for inhibiting the operation of said alarm device, and means responsive to excursions in the amplitude of said signals beyond said predetermined limits for inhibiting the operation of said third relay.

References Cited in the file of this patent

UNITED STATES PATENTS

| | | |
|---|---|---|
| 2,752,589 | De Long | June 26, 1956 |
| 2,794,972 | Dimmer | June 4, 1957 |